United States Patent [19]

Hu

[11] 3,931,024

[45] Jan. 6, 1976

[54] NITROGEN-CONTAINING DISPERSANT FROM POLYOLEFIN

[75] Inventor: Shih-En Hu, Westfield, N.J.

[73] Assignee: Exxon Research and Engineering Company, Linden, N.J.

[22] Filed: June 8, 1972

[21] Appl. No.: 260,777

[52] U.S. Cl. .... 252/51.5 R; 252/51.5 A; 260/563 R; 260/563 P; 260/583 P; 260/584 R; 44/71
[51] Int. Cl.$^2$ ..................... C10M 1/32; C10M 3/26; C10M 5/20; C10M 7/30
[58] Field of Search ................. 252/51.5 A, 51.5 R; 260/563 P, 563 R, 583 P, 584 R

[56] References Cited
UNITED STATES PATENTS

| | | | |
|---|---|---|---|
| 3,316,177 | 4/1967 | Dorer............................ | 252/51.5 A |
| 3,432,479 | 3/1969 | Verdol et al................. | 252/51.5 A X |
| 3,513,095 | 5/1970 | Love et al..................... | 252/51.5 A |
| 3,687,849 | 8/1972 | Abbott........................ | 252/51.5 A X |
| 3,687,905 | 8/1972 | Dorer......................... | 252/51.5 A X |
| 3,769,216 | 10/1973 | Gordon et al................. | 252/51.5 R |
| 3,785,980 | 1/1974 | Wilgus........................ | 252/51.5 A |

FOREIGN PATENTS OR APPLICATIONS

| | | |
|---|---|---|
| 983,040 | 2/1965 | United Kingdom..... 252/51.5 A UX |

*Primary Examiner*—Paul F. Shaver
*Attorney, Agent, or Firm*—Byron O. Dimmick; Frank T. Johmann

[57] ABSTRACT

A multifunctional additive for an oil from the class consisting of gasoline, middle distillate fuels, and lubricating oils is prepared by the reaction of an aliphatic polyamine such as diethylene triamine, tetraethylene pentamine, and the like with the product that is obtained by the noncatalyzed air oxidation of a polyolefin or a halogenated polyolefin such as polyisobutylene or chlorinated polyisobutylene.

11 Claims, No Drawings

NITROGEN-CONTAINING DISPERSANT FROM POLYOLEFIN

FIELD OF THE INVENTION

The present invention concerns multifunctional dispersant additives for oil compositions including gasoline, fuel oil, heating oil and lubricating oil. It also concerns the preparation of these additives and oil compositions containing them. The additives can be characterized as oil-soluble polyamine addition compounds of high molecular weight oxygenated polyolefins or oxygenated halopolyolefins.

Numerous addition agents are known in the prior art for improving the desirable properties of fuels and lubricants, including high oxidation resistance, freedom from the formation of insoluble material, protection from rust and corrosion, and the like. For heavy duty service in high compression internal combustion engines, it is required that the lubricants contain additives that will impart good dispersancy and detergency as well as good oxidation stability. By dispersancy is meant the prevention of the deposition of insoluble material and by detergency is meant the quality of removing deposits where they have been formed. Recent emphasis in this field of additives has been placed on development of metal-free additives that will not form an ash. The conventional metal-containing additives have the disadvantage of leaving an ash residue which tends to accumulate in the combustion chamber of the engine and cause spark plug fouling, valve burning, preignition, and similar undesirable conditions. Ash-free dispersants are also of advantage in diesel fuels, fuel oil compositions, and gasolines as well. Additives that will function not only as good dispersants and detergents but that will additionally furnish protection from wear and from rust and corrosion are of particular value.

REFERENCE TO THE PRIOR ART

It is disclosed in British Pat. No. 1,172,818 that a detergent for a lubricating oil composition can be prepared by oxidizing a polymer of a $C_2$ to $C_4$ olefin with ozone, treating the ozonized polyolefin with hydrogen to provide a polyalkyl ketone, and condensing the ketone with a polyamine such as tetraethylene pentamine.

DESCRIPTION OF THE INVENTION

It has now been found in accordance with the present invention that a highly effective dispersant for a lubricating oil or a fuel can be prepared by the noncatalyzed air-oxidation of a polyolefin or of a halogenated polyolefin to form an oxygencontaining material which is then reacted with an aliphatic polyamine under conditions that cause the formation of an addition product which differs chemically from the Schiff bases of the prior art.

The starting materials for the preparation of the additives of this invention are the polymers of $C_2$ to $C_5$ monoolefins, e.g., ethylene, propylene, butylene, isobutylene and pentene. The polymers can be homopolymers as well as copolymers of two or more of such olefins. The polymers will have number average molecular weights within the range of about 400 to about 4000, or more usually from about 600 to about 2400. Representative olefin polymers that can be used include, for example, a propylene polymer averaging about 36 carbon atoms per molecule, an ethylene polymer of about 2000 molecular weight, a copolymer of about 70 weight percent of ethylene and about 30 weight percent of propylene of about 3000 number average molecular weight, and a polyisobutylene of about 1200 molecular weight.

The air oxidation of a halogenated polymer is quite similar to the oxidation of a nonhalogenated polymer. Under the same conditions of oxidation, it has been found that oxygen consumption and selectivity to oxidized products appear to be independent of whether or not the polymer was first halogenated. However the oxidized products of the halogenated polymer do contain residual halogen. A principal advantage of first halogenating the polymer appears to be that the subsequent addition reaction with the polyamine proceeds more readily.

If a halogenated olefin polymer is used, halogenation can be with either bromine or chlorine, but is preferably with the latter, using sufficient halogen to provide from about 0.5 to about 2 atoms of halogen per molecule of the olefin polymer. The halogenation step can be conducted in the temperature range of from about ordinary ambient temperatures up to about 120°C. It is sometimes helpful in the halogenation step to dissolve the polymer in a suitable solvent such as carbon tetrachloride in order to lower the viscosity of the polymer, although the use of such a solvent is not necessary. The time for halogenation can be varied to some extent by the rate at which the halogen is introduced. Ordinarily from about 2 to 5 hours is a satisfactory halogenation period.

The oxidation of the nonhalogenated polymer or of the halogenated polymer is conducted by contacting with air at a temperature in the range of from about 120° to about 250°C., more usually at a temperature in the range of about 150° to about 220°C. The lower temperatures tend to favor more unsaturation in the product. Excessively high temperatures are generally to be avoided so as to minimize degradation. No catalyst is required. Atmospheric pressure or somewhat elevated pressures can be used, the latter favoring the mass transfer rate. Efficient agitation is also helpful in increasing the rate.

The oxygenation is conducted for a sufficient period of time to obtain a product having from about 1 to about 4.5 percent oxygen; the optimum oxygen content is within the range of about 1.8 to about 3 percent by weight. The progress of the reaction is conveniently followed by periodic sampling of the reaction mixture and determination of the oxygen content. The product obtained by this oxidation treatment is a mixture of carbonyl compounds.

The oxygen-containing product obtained by the air oxidation of a halogenated or nonhalogenated olefin polymer is condensed with an aliphatic polyamine employing a mole ratio of polyamine to oxygenated material of from about 0.2 to about 2.5 moles of polyamine per mole of the oxygenated material. The reaction temperature for this condensation reaction will generally be in the range of from about 60° to about 250°C. In most cases, however, the temperature range will be from about 120° to about 220°C.

The aliphatic polyamine that is employed in preparing the reaction products of the present invention can be an alkylene polyamine fitting the following general formula:

wherein n is 2 to 4 and m is a number from 0 to 10. Specific compounds coming within the formula include diethylene triamine, triethylene tetramine, propylene diamine, tetraethylene pentamine, dibutylene triamine, dipropylene triamine, octaethylene nonamine, and tetrapropylene pentamine. N,N-di-(2-aminoethyl) ethylene diamine can also be used. Other aliphatic polyamine compounds that can be used include the N-aminoalkyl piperazines of the formula:

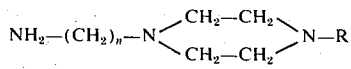

wherein n is a number 1 to 3, and R is hydrogen or an aminoalkyl radical containing 1 to 3 carbon atoms. Specific examples include N-(2-aminoethyl) piperazine, N-(2-aminosopropyl) piperazine, and N,N'-di-(2-aminoethyl) piperazine.

The alkylene polyamines used in the practice of this invention can be either pure alkylene amines or they can be commercial mixtures. For example, one process for preparing alkylene amines involves the reaction of an alkylene chloride such as ethylene chloride or proplyene chloride with ammonia, which results in the production of somewhat complex mixtures of alkylene amines including various piperazines. One useful commercial product is a mixture of ethylene amines prepared by the reaction of ethylene chloride and ammonia and having a composition that corresponds to that of a tetraethylene pentamine. One such mixture is known in the trade under the name "Polyamine H."

Still other alkylene amino compounds that can be used include dialkylamino alkyl amines such as dimethylamino methyl amine, dimethylamino propyl amine, methylpropylamino amyl amine, etc. These may be characterized by the formula:

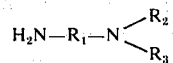

wherein $R_1$ is an alkylene radical, e.g. an ethylene, propylene, or butylene radical, and $R_2$ and $R_3$ are $C_1$ to $C_5$ alkyl radicals.

Thus, the alkylene polyamine or aliphatic polyamine compound used in this invention can be broadly characterized as an alkylene amino compound containing from 2 to 12 nitrogen atoms wherein pairs of nitrogen atoms are joined by alkylene groups of from 2 to 4 carbon atoms.

The reaction of the aliphatic polyamine with the mixture of carbonyl compounds in the process of this invention appears to be one of addition with essentially no formation of Schiff bases. The evidence for this is that material balance determinations show that there is essentially no loss of oxygen during the reaction with the polyamine and that essentially no water is produced during the reaction.

The additives of this invention will be employed in concentrations ranging from about 0.001 to about 10 weight percent in oil compositions ranging from gasoline fractions through middle distillate fuels and lubricating oils.

For use as lubricating oil additives the reaction products of this invention can be incorporated in lubricating oil compositions in concentrations within the range of from about 0.1 to about 10 weight percent and will ordinarily be used in concentrations of from about 0.1 to about 5 weight percent. The lubricating oils to which the additives of the invention can be added include not only mineral lubricating oils, but synthetic oils also. The mineral lubricating oils may be of any preferred types, including those derived from the ordinary paraffinic, naphthenic, asphaltic, or mixed base mineral crude oils by suitable refining methods. Synthetic hydrocarbon lubricating oils may also be employed, as well as nonhydrocarbon synthetic oils, including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, and complex esters, as for example the complex ester formed by the reaction of 1 mole of sebacic acid with 2 moles of tetraethylene glycol and 2 moles of 2-ethyl hexanoic acid.

The additives of this invention can also be employed in middle distillate fuels for inhibiting corrosion and the formation of sludge and sediment in such fuels. Concentration ranges of from about 0.001 to about 2 weight percent, or more generally from about 0.005 to about 0.2 weight percent are employed. Petroleum distillate fuels boiling in the range of from about 300° to about 900°F. are contemplated. Typical of such fuels are No. 1 and No. 2 fuel oils that meet ASTM Specification D-396-48T, diesel fuels qualifying as Grades 1D, 2D and 4D of ASTM Specification D-972-51T, and various jet engine fuels. Because they are ashless, these additives are particularly desirable for such fuels in that they do not give rise to glowing ashes nor deter from the burning qualities of the distillates. These additives can also be used in conjunction with other prior art ashless additives for fuels, such as polymers of acrylic or methacrylic acid esters, high molecular weight aliphatic amines, etc.

The additives of this invention can also be employed either alone or in combination with other hydrocarbon-soluble additives, in jet fuels and gasolines in concentrations ranging from about 0.001 to 1.0 weight percent as detergent and/or rust preventive additives.

In either the fuel or lubricant compositions, other conventional additives may also be present, including dyes, pour point depressants, antiwear agents, e.g. tricresyl phosphate, zinc dialkyl dithiophosphates of 3 to 8 carbon atoms, antioxidants such as phenyl-alpha-naphthylamine, tert. octylphenol sulfide, bis-phenols such as 4,4'-methylene bis(2,6-di tert. butylphenol), viscosity index improvers such as polymethacrylates, polyisobutylene, alkyl fumarate-vinyl acetate copolymers, and the like as well as other ashless dispersants or detergents.

The dispersant additives of the invention can also be used to enhance the dispersancy-detergency of lubricants containing conventional metal-containing detergents, provided no problem of incompatability arises, and thereby obtain added dispersancy or detergency without materially increasing the total ash-forming properties of the composition.

The additives of this invention will not only be used in finished lubricant or fuel compositions but also as additive concentrates. Such concentrates can contain from about 10 to about 80 weight percent of additive on an active ingredient basis, the balance being lubricating oil or fuel. Such concentrates are convenient for handling the additive when conducting the ultimate blending operation to prepare the finished lubricating oil or fuel composition.

The nature of this invention will be further understood when reference is made to the following examples, which include preferred embodiments.

EXAMPLE 1

A quantity of polyisobutylene of about 980 average molecular weight was oxidized by blowing air through a quantity of the polymer at 170°C. for 25 hours, no catalyst being used. More specifically, 1640 grams of the polymer was thus oxidized using a stream of air at the rate of 1 liter of air per minute measured at standard conditions. The oxidized polymer was found to contain 4.3 weight percent of oxygen.

This oxidized polyisobutylene was reacted with an alkylene polyamine in the following manner. First 8 grams of Polyamine H, a commercial mixture of polyamines roughly equivalent to tetraethylene pentamine, and 500 grams of a refined lubricating oil known as Solvent 150 Neutral were placed in a reactor and heated to 150°C. Then while the mixture was stirred at 150°C., 100 grams of the oxidized polybutene was added over a period of 4 hours. The reaction product was then filtered and the filtrate was held without stirring at a temperature of 135°F. (approximately 53°C.) for several days. The product was an additive concentrate containing approximately 65 percent active ingredient and 35 percent diluent. Analysis of the concentrate showed an oxygen content of 2.70 weight percent and a nitrogen content of 1.11 weight percent. Material balance calculations showed that the product contained all of the oxygen originally present in the reactants and 70 percent of the nitrogen. The fact that all of the oxygen entering the reaction could be accounted for in the final product indicates that the reaction product is an addition type compound rather than a Schiff base, since the Schiff base reaction requires the splitting out of water in the reaction.

EXAMPLE 2

A product similar to that of Example 1 was prepared from air-oxidized polyisobutylene wherein the oxidized product contained 2.7% of oxygen. The additive concentrate (containing about 65 weight percent active ingredient) after the reaction with tetraethylene pentamine analyzed 1.85% oxygen and 0.52 weight percent nitrogen. Material balance calculations showed that all of the oxygen and 33 percent of the nitrogen originally present in the reactants could be accounted for in the product.

EXAMPLE 3

Air at the rate of 1.33 liters per minute was blown through 1400 grams of polyisobutylene of 940 molecular weight for 30 minutes at 185°C. The product contained 2.05 weight percent oxygen. The oxidized material was condensed with Polyamine H as in Example 1 at 140°C. for 4 hours, using a proportion of diluent oil sufficient to provide a 50 weight percent concentrate of active ingredient. The concentrate analyzed 0.68 weight percent nitrogen and 0.65 weight percent oxygen.

EXAMPLE 4

(Oxidation of Chlorinated Polyisobutylene)

Chlorine was bubbled through a quantity of polyisobutylene of about 920 number average molecular weight for 3 hours at 93°C. and the product was then purged with a stream of nitrogen for 1 hour at ambient temperature. The resulting chlorinated polyisobutylene had a chlorine content of 4.5 weight percent.

The effect of time and temperature on the oxidation of this chlorinated polyisobutylene was determined by subjecting 300-gram samples of the chlorinated polyisobutylene to noncatalyzed oxidation with air for various periods of time at temperatures in the range of 160° to 200°C. In each case, 3 liters of air per minute was bubbled through the chlorinated polyisobutylene. Each of the products obtained was analyzed for its content of oxygen and residual chlorine. The results obtained are shown in Table 1 which follows:

TABLE I

AIR OXIDATION OF CHLORINATED POLYISOBUTYLENE

| Reaction Conditions | | Analysis, Wt. % | |
|---|---|---|---|
| Temp., °C. | Time, Hrs. | Oxygen | Residual Chlorine |
| 160 | 8 | 1.34 | 1.21 |
| 160 | 16 | 3.50 | 1.19 |
| 170 | 4 | 1.19 | 1.69 |
| 170 | 6 | 1.67 | 1.37 |
| 170 | 8 | 2.10 | 1.17 |
| 185 | 6 | 2.95 | 0.79 |
| 190 | 4 | 1.97 | 1.81 |
| 190 | 8 | 3.46 | 0.50 |
| 200 | 4 | 1.59 | 0.92 |
| 200 | 6 | 1.95 | 0.67 |
| 200 | 8 | 3.25 | 0.39 |

EXAMPLE 5

(Condensation with Tetraethylene Pentamine)

Samples of oxidation products of chlorinated polyisobutylene, having varying oxygen contents and obtained by the procedure described in Example 4, were each reacted with tetraethylene pentamine. In each case, 30 grams of the oxidized product was mixed with 30 grams of a solvent neutral lubricating oil of 150 SUS viscosity at 100°F. and 2.5 grams of tetraethylene pentamine. The mixture was heated with stirring at 150°C. for 8 hours under a blanket of nitrogen. In each case the product was then filtered. In the following Table II are shown the oxygen contents of the respective oxidized starting materials and the nitrogen contents of the corresponding product concentrates.

TABLE II

| Product | Oxygen Content of Oxidized Starting Material, Wt. % | Nitrogen Content of Product Concentrate, Wt. % |
|---|---|---|
| 5-1 | 1.40 | 0.68 |
| 5-2 | 1.60 | 0.77 |
| 5-3 | 1.76 | 1.22 |
| 5-4 | 2.27 | 1.01 |
| 5-5 | 2.70 | 1.07 |
| 5-6 | 2.75 | 1.01 |
| 5-7 | 2.81 | 1.12 |
| 5-8 | 2.94 | 0.80 |
| 5-9 | 3.05 | 0.87 |

EXAMPLE 6

(Sludge Dispersancy Tests)

Additives of this invention were subjected to a sludge inhibition bench test which has been found, after a large number of evaluations, to be an excellent screening test for assessing the dispersing power of lubricating oil dispersant additives.

The medium chosen for the sludge inhibition bench test was used crankcase oil having an original viscosity of about 325 SUS at 100°F. that had been used in a taxicab that was driven generally for short trips only, thereby causing a buildup of a high concentration of sludge precursors. The oil that was used contained only a refined base oil, a viscosity index improver, a pour point depressant and zinc dialkyldithiophosphate antiwear additive. The oil contained no sludge dispersants. A quantity of such used oil was acquired by draining and refilling the taxicab crankcase at 1000–2000 mile intervals.

The sludge inhibition bench test is conducted in the following manner. The used crankcase oil, which is milky brown in color, is freed of sludge by centrifuging for 1 hour at 39,000 gs. The clear bright red supernatant oil is decanted from the insoluble sludge particles thereby separated out; however the superatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil small concentrations, e.g. 0.5, 1, or 2 weight percent, on an active ingredient basis, of the particular additive being tested. Comparison blends are also prepared using a standardized commercial dispersant. Ten grams of each blend being tested is placed in a stainless steel centrifuge tube and is heated at 280°F. for 16 hours in the presence of air. Following the heating, the tube containing the oil being tested in cooled and then centrifuged for 30 minutes at 39,000 gs. Any deposits of sludge that form in this step are separated from the oil by decanting the supernatant oil and then carefully washing the sludge deposits with 25 ml of pentane to remove all remaining oil from the sludge. Then the weight of the solid sludge that has been formed in the test, in milligrams, is determined by drying the residue and weighing it. The results are recorded as milligrams of sludge per 10 grams of oil.

Comparison can be made directly between the efficacy of the sludge dispersant under test and that of a standard dispersant. Alternatively the results can be reported as a ratio of the sludge obtained with the additive being tested to the sludge obtained with a sample of the used oil itself run at the same time in the test. (Sludge dispersing ratios)

A series of blends were prepared containing 1 weight percent and 2 weight percent, on an active ingredient basis, of the additives of Example 5 and these blends were subjected to the sludge inhibition bench test. Blends were also prepared using a commercial dispersant designated PIBSA/TEPA which was prepared by reaction of 1 mole of tetraethylene pentamine with 2.8 moles of polyisobutenyl succinic anhydride obtained from polyisobutylene of about 1000 number average molecular weight. This dispersant was obtained in the form of an additive concentrate containing about 50 weight percent of active ingredient in lubricating oil. The additive concentrate analyzed about 1.14% nitrogen. Sufficient quantities of the concentrate were used in making the test blends to furnish 1 and 2 weight percent of actual additive. The test results are given in Table III which follows. For convenience in comparing dispersant activity in relation to nitrogen contents, the nitrogen contents of the addition are also given in the table. The numbers identifying the products tested refer to the examples. The numbers in brackets (for the Example 1 and Example 3 products) refer to sludge dispersing ratios.

TABLE III

SLUDGE INHIBITION TEST RESULTS

| Product Tested | Nitrogen Content Wt. % | Mg Sludge/10 g Oil | |
|---|---|---|---|
| | | 1% Additive | 2% Additive |
| 5–1 | 0.68 | 8.7 | 2.9 |
| 5–2 | 0.77 | 5.5 | 2.7 |
| 5–3 | 1.22 | 6.0 | 3.1 |
| 5–4 | 1.01 | 2.7 | 1.3 |
| 5–5 | 1.07 | 4.7 | 4.2 |
| 5–6 | 1.01 | 3.9 | 3.3 |
| 5–7 | 1.12 | 4.4 | 2.9 |
| 5–8 | 0.80 | 5.8 | 4.2 |
| 5–9 | 0.87 | 5.9 | 4.7 |
| PIBSA/TEPA | 1.14 | 5.3 | 2.2 |
| 3 | 0.68 | 5.3 [0.43] | — |
| 1 | 1.11 | 11.4 [0.78] | 0.2 [0.03] |

COMPARATIVE EXAMPLE A

A quantity of polyisobutylene (PIB) of about 900 number average molecular weight was treated with ozone and the product was converted to a ketone, following the procedures described in Examples 1 and 3 of British Pat. No. 1,172,818, adhering as closely as was practicable to the written description. There were added to a reaction flask 180 grams (0.2 mole) of the polyisobutylene, 300 milliliters of normal hexane and 9.6 grams of anhydrous methyl alcohol. The mixture was cooled to a temperature of about −65°C. and ozonized at this temperature for 4½ hours using a flow rate of ozone of 3.276 grams per hour. It was determined that the uptake of ozone was 8696 milligrams. Approximately 200 milliliters of normal hexane was removed from the product under vacuum and 200 milliliters of glacial acetic acid was added. Then 33 grams (0.5 mole) of zinc dust was added in small portions over a period of ½ hour. The temperature rose to 35°C. Thereafter, the mixture was heated at 60–65°C. for 1 hour. Then the acetic acid, zinc and zinc acetate were separated from the normal hexane layer, after which step the hexane layer was washed with 6 successive portions of water (300 milliliters in each portion) and thereafter dried over anhydrous magnesium sulfate and filtered. Hexane was removed from the product by evaporation giving a yield of 121 grams of the carbonyl derivative. The product contained 2.08% of oxygen.

A 300 gram portion of the chlorinated polyisobutylene of 4.5 weight percent chlorine content described in Example 4 was air oxidized for 8 hours at 170°C., giving a product containing 2.08% of oxygen.

Each of the above oxygenated products was mixed with an equal weight of a solvent neutral lubricating oil of 150 SUS viscosity at 100°F. and then reacted with tetraethylene pentamine (TEPA) as in Example 5 except that the temperature was 120°C., using 2.5 moles of the oxidized material per mole of TEPA.

Each of the final reaction products was tested for its sludge dispersing ability in the sludge inhibition bench test described in Example 6, at concentration levels of 0.5, 1.0 and 2.0 weight percent active ingredient. The results obtained are given in Table IV which follows:

TABLE IV

| | Sludge Inhibition Test Results mg sludge/10 g oil | | |
|---|---|---|---|
| Concentration of Additive | 0.5% | 1% | 2% |
| Source of Oxygenated Reactant | | | |
| Air Oxidized PIB | 7.6 | 6.3 | 2.2 |
| Ozonized PIB | 12.9 | 10.6 | 9.3 |

COMPARATIVE EXAMPLE B

The difference between ozonization as taught in the prior art and air oxidation in accordance with the present invention is evident from the following comparative preparations. In one preparation the product of ozonization described in Comparative Example A was reacted with hexylamine using 25 grams of the ozonized product containing 2.08% of oxygen, 25 grams of lubricating oil diluent and 10 grams of hexylamine. The reaction was conducted at 140°C. for 8 hours under a blanket of nitrogen at the end of which time excess hexylamine was stripped from the product. In the second preparation the same procedure was used substituting 25 grams of an air-oxidized polyisobutylene having an oxygen content of 0.95 percent. In a third preparation an air-oxidized polyisobutylene of 2.4% oxygen content was used. Hexylamine was chosen for these reactions in place of an alkylene polyamine in order to study the mechanism of the reaction. The 10 grams of hexylamine ensured that there would be an excess of amine present. The oxygen contents and nitrogen contents of the reaction products were then determined and material balance calculations were made. The results are shown in the following Table V.

TABLE V

| Oxidation Source | Wt % Oxygen Orig. | Wt % Oxygen Final | Wt % N Incorporated | % Condensation | % Addition |
|---|---|---|---|---|---|
| Ozone | 2.0 | 1.0 | 0.76 | 100 | 0 |
| Air | 2.4 | 2.0 | 0.88 | 30 | 70 |
| Air | 0.95 | 0.95 | 0.58 | 0 | 100 |

It will be noted from the results in Table V that in the case of the ozonized polyisobutylene only half of the oxygen originally present appeared in the final product, showing that for each nitrogen atom that was incorporated one oxygen atom had been removed, which is the case when a Schiff base is formed. In contrast when using air-oxidized polyisobutylene all or most of the oxygen originally present in the starting material could be accounted for in the final product. Thus in the case of the ozonized polyisobutylene the reaction was 100 percent a condensation reaction whereas when using air-oxidized polyisobutylene from 70 to 100 percent of the reaction was an additive reaction.

EXAMPLE 7

(Engine Tests)

A fully formulated lubricating oil blend was prepared by blending 4.75 weight percent of a 50 percent concentrate of a dispersant additive prepared in accordance with the present invention, 7.7 weight percent of a viscosity index improver, 1.1 percent of a commercial zinc dialkyl dithiophosphate antiwear additive (70 percent active ingredient), 0.9 percent of an overbased calcium hydrocarbon sulfonate concentrate (300 total base number), 0.1 weight percent of a rust inhibitor (ethoxylated alkyl phenol) and 1.9 percent of a commercial barium overbased detergent-inhibitor, the balance of the formulation being a refined lubricating oil base stock. The fully formulated lubricant had a viscosity in the SAE 10W-30 range.

For comparison a similar blend was prepared substituting for the 4.75 weight percent of the additive of this invention 4.75 weight percent of the commercial dispersant additive concentrate designated PIBSA/TEPA described in Example 6.

Each of the blends prepared as described was subjected to the MS Sequence VC Engine Test which is a test well known in the automotive industry. The test is run in a Ford engine of 302 cubic inch displacement following the procedure described in the publication entitled "Multicylinder Test Sequences for Evaluating Automotive Engine Oils" (ASTM Special Publication 315-E). At the end of each test various parts of the engine are rated on a merit basis wherein 10 represents a perfectly clean part, and lesser numbers represent increasing degrees of deposit formation. The various ratings are then totaled and averaged on the basis of 10 as a perfect rating. The results obtained with the two blends described above are given in Table VI.

TABLE VI

MS SEQUENCE VC TEST RESULTS
MERIT RATINGS (BASIS 10)

| | Additive of Invention | Comparative Additive |
|---|---|---|
| Sludge Merit | 8.0 | 7.8 |
| Varnish Merit | 7.2 | 7.6 |
| Piston Skirt Varnish Merit | 7.5 | 7.8 |

The above test results show that the additive of the present invention was essentially as good as the commercial dispersant additive in its engine performance.

The scope of this invention is defined by the appended claims and is not limited to the specific examples.

What is claimed is:

1. An oil composition comprising a major proportion of an oil selected from the class consisting of gasoline, middle distillate fuel, hydrocarbon lubricating oil and synthetic lubricating oil, to which has been added from about 0.001 to about 10 weight percent of an oil-soluble nitrogen-containing dispersant which is an addition product obtained by directly reacting, with essentially no water produced, at about 60° to 250°C., about 0.2 to about 2.5 moles of an aliphatic polyamine which is an alkylene amino compound containing from 2 to 12 nitrogen atoms wherein pairs of nitrogen atoms are joined by alkylene groups of 2 to 4 carbon atoms, with one mole of an oxygen-containing product of the non-catalyzed air oxidation of a 400 to 4000 molecular weight unsaturated polymer of a $C_2$ to $C_5$ monoolefin, or of the non-catalyzed air oxidation of said polymer that has first been halogenated with sufficient chlorine or bromine to incorporate about 0.5 to 2 atoms of halogen per double bond of said polymer, wherein said air oxidation consists of contacting said polymer with air at a temperature of about 120° to 250°C. sufficient to obtain said oxygen-containing product having about 1 to about 4.5 wt. % oxygen, and wherein about 70 to 100 percent of said reaction between said polyamine and said oxygen-containing product is said addition product, and wherein essentially all of the oxygen present in said oxygen-containing product is still present after reaction with said polyamine to form said nitrogen-containing dispersant.

2. An oil composition according to claim 1, wherein said oil is a hydrocarbon lubricating oil.

3. An oil composition as defined by claim 2, wherein said polymer is polyisobutylene of about 600 to 2400 molecular weight, wherein said air oxidation is carried out at about 120° to 220°C., and said oxygen-containing product contains about 1.8 to about 3 wt. % oxygen.

4. An oil composition according to claim 2, wherein said polymer is chlorinated polyisobutylene of about 600 to 2400 molecular weight, wherein said air oxidation is carried out at about 120° to 220°C., and said oxygen-containing product contains about 1.8 to about 3 wt. % oxygen.

5. An oil composition according to claim 3, wherein said polyamine is tetraethylene pentamine.

6. An oil composition according to claim 4, wherein said polyamine is tetraethylene pentamine.

7. A process for preparing an oil-soluble nitrogen-containing ashless dispersant additive for an oil composition which comprises oxidizing a 400 to 4000 average molecular weight polymer or halogenated polymer of a $C_2$ to $C_5$ aliphatic monoolefin, said oxidizing consisting of contacting said polymer with air in the absence of a catalyst at a temperature within the range of about 120° to 250°C. for a sufficient time to obtain an oxygenated product containing about 1 to 4.5 weight percent oxygen, and (2) thereafter directly reacting one mole of the oxygenated product with from about 0.2 to 2.5 moles of an aliphatic polyamine which is an alkylene amino compound containing from 2 to 12 nitrogen atoms wherein pairs of nitrogen atoms are joined by alkylene groups of 2 to 4 carbon atoms, at a temperature within the range of about 60° to 250°C., wherein about 70 to 100 percent of said reaction between said polyamine and said oxygenated product is an additive reaction, with essentially no water produced, and wherein essentially all of the oxygen present in said oxygenated product is still present after reaction with said polyamine to form said additive.

8. A process according to claim 7, wherein polyisobutylene of about 600 to 2400 molecular weight is oxidized to form said oxygenated product, wherein said air oxidation is carried out at about 120° to 220°C., and said oxygenated product contains about 1.8 to about 3 wt. % oxygen.

9. A process according to claim 7, wherein chlorinated polyisobutylene of about 600 to 2400 molecular weight is oxidized to form said oxygenated product, wherein said air oxidation is carried out at about 120° to 220°C. and said oxygenated product contains about 1.8 to about 3 wt. % oxygen.

10. A process according to claim 8, wherein said polyamine is tetraethylene pentamine.

11. A process according to claim 9, wherein said polyamine is tetraethylene pentamine.

* * * * *